(12) United States Patent
Yasuda et al.

(10) Patent No.: US 7,200,510 B2
(45) Date of Patent: Apr. 3, 2007

(54) MEASUREMENT CONTROL APPARATUS INCLUDING INTERFACE CIRCUITS

(75) Inventors: Takeshi Yasuda, Kobe (JP); Takashi Shimizu, Kobe (JP)

(73) Assignee: Fujitsu Ten Limited, Kobe-shi (JP)

( * ) Notice: Subject to any disclaimer, the term of this patent is extended or adjusted under 35 U.S.C. 154(b) by 50 days.

(21) Appl. No.: 10/109,793

(22) Filed: Mar. 29, 2002

(65) Prior Publication Data
US 2002/0143487 A1 Oct. 3, 2002

(30) Foreign Application Priority Data
Mar. 30, 2001 (JP) ............................. 2001-101356

(51) Int. Cl.
*G06F 3/00* (2006.01)
(52) U.S. Cl. .................. 702/119; 702/120; 702/122; 702/127; 701/33
(58) Field of Classification Search ........ 702/113–115, 702/117–122, 127, 182–186; 700/1, 12; 701/33, 36
See application file for complete search history.

(56) References Cited

U.S. PATENT DOCUMENTS

| | | | | |
|---|---|---|---|---|
| 3,582,896 | A * | 6/1971 | Silber | 710/266 |
| 4,644,467 | A * | 2/1987 | McCarthy | 710/244 |
| 4,791,553 | A * | 12/1988 | Campanini | 710/48 |
| 5,060,226 | A * | 10/1991 | Gewin et al. | 370/244 |
| 5,149,945 | A * | 9/1992 | Johnson et al. | 235/380 |
| 5,396,651 | A * | 3/1995 | Nitardy | 455/517 |
| 5,467,272 | A * | 11/1995 | Yoshida et al. | 701/1 |
| 5,491,418 | A * | 2/1996 | Alfaro et al. | 324/402 |
| 5,555,498 | A * | 9/1996 | Berra et al. | 701/33 |
| 5,610,941 | A * | 3/1997 | Tanaka et al. | 375/222 |
| 5,689,811 | A * | 11/1997 | Hatano et al. | 455/517 |
| 6,075,438 | A | 6/2000 | Abe et al. | |
| 6,115,831 | A | 9/2000 | Hanf et al. | |
| 6,211,702 | B1 * | 4/2001 | Nagatome | 326/83 |

(Continued)

FOREIGN PATENT DOCUMENTS

JP        05166376 A * 7/1993

(Continued)

OTHER PUBLICATIONS

IBM Technical Disclosure Bulletin #NN85091391, Sep. 1, 1985.*

*Primary Examiner*—Jeffrey R West
(74) *Attorney, Agent, or Firm*—Christie, Parker & Hale, LLP

(57) ABSTRACT

A measurement control apparatus designed to automatically select an interface circuit compatible with a measurement controlled object without error. A measurement control processor outputs interface setting data for setting one interface circuit compatible with the measurement controlled object in advance of output of measurement control data to the measurement controlled object. Based on this, an interface setting means activates only that interface circuit. Further, the processor is provided with a loopback unit for returning the interface setting data to the measurement control processor and confirms the match of the output interface setting data and the returned interface setting data. Further, it is provided with an identification code setting means for setting an identification code unique to an interface board mounting the interface circuit and confirms that the interface board has been correctly selected.

15 Claims, 10 Drawing Sheets

U.S. PATENT DOCUMENTS

| | | | |
|---|---|---|---|
| 6,260,062 B1 * | 7/2001 | Davis et al. | 709/223 |
| 6,321,151 B1 * | 11/2001 | Shultz | 701/29 |
| 6,407,554 B1 * | 6/2002 | Godau et al. | 324/503 |
| 6,483,444 B2 * | 11/2002 | Hoffman et al. | 340/999 |
| 6,654,669 B2 * | 11/2003 | Eisenmann et al. | 701/1 |
| 2002/0136283 A1 * | 9/2002 | Davis et al. | 375/222 |
| 2003/0074510 A1 * | 4/2003 | Ishii | 710/305 |

FOREIGN PATENT DOCUMENTS

| | | |
|---|---|---|
| JP | 7-84819 | 3/1995 |
| JP | 07084819 A * | 3/1995 |
| JP | 07084819 A * | 3/1995 |

* cited by examiner

MEASUREMENT CONTROL APPARATUS INCLUDING INTERFACE CIRCUITS

CROSS-REFERENCE TO RELATED APPLICATION

This application claims priority of Japanese patent Application No. 2001-101356, filed on Mar. 30, 2001.

BACKGROUND OF THE INVENTION

1. Field of the Invention

The present invention relates to a measurement control apparatus, more particularly-relates to a measurement control apparatus for measuring a measurement controlled object using a processor (PC) through an interface.

As one example, there is a measurement control system for an electronic control unit (ECU) mounted on a vehicle which measures and evaluates the same using a PC. This system is realized by a measurement control apparatus. In general, a PC is used as the heart of the measurement control apparatus. In this case, the digital input/output (I/O) board is often used.

The digital I/O board for a PCI bus is similarly connected to a digital I/O unit of the measurement controlled object (the above ECU etc.). In this case, the level of the digital I/O board of the former (PC) is usually a TTL level of for example 5V. As opposed to this, the level of the digital I/O unit of the latter (ECU) is the battery voltage-GND level of for example 13V. Therefore, the measurement control apparatus has to include as components not only the above PC, but also an interface circuit for achieving a match between the two electrically.

On the other hand, according to the above example, different types of ECUs are used as the ECUs mounted in vehicles according to the types of the vehicles. This being the case, the interface circuit also must be selected to be compatible with the ECU in question. The present invention relates to a technique for selecting an interface circuit compatible with each ECU.

2. Description of the Related Art

As will be explained later with reference to FIG. 10, in general a measurement control apparatus is mainly comprised of a measurement control processor and interface circuits. When a measurement controlled object is given, one interface circuit compatible with that object is used so as to output measurement control data compatible with the object from the processor to the object. When response data is returned from the object operating based on this measurement control data, this is input to the processor through the interface circuit. The processor analyzes this response data to evaluate the object. Therefore, in a conventional measurement control apparatus, there was the problem that considerable work and time were required to assemble a compatible interface circuit into the apparatus when a new measurement controlled object was presented for measurement.

Further, when a user performed a later explained reconnection operation or channel reconfiguration operation, a mistake by the user (error in reconnection or error in reconfiguration) in the work for reconnection or channel reconfiguration would cause the measurement controlled object to break down or sometimes burn out.

SUMMARY OF THE INVENTION

An object of the present invention is to provide a measurement control apparatus which does not require manual switching of the interface circuit by the user and can eliminate breakdowns or burnout of the measurement controlled object.

To attain the above object, the measurement control processor (2) outputs interface setting data for setting one interface circuit (3) compatible with the measurement controlled object in advance of output of measurement control data to the measurement controlled object (4). Based on this, an interface setting means (10) activates only that interface circuit. Further, the processor is provided with a loopback means (20) for returning the interface setting data to the measurement control processor (2) and confirms the match of the output interface setting data and the returned interface setting data. Further, it is provided with an identification code setting means (30) for setting an identification code unique to an interface board carrying the interface circuits (3) and confirms that the interface board has been correctly selected. Due to this, it is possible to automatically select the interface circuit compatible with the measurement controlled object without error.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Before describing the embodiments of the present invention, the related art and the disadvantages therein will be described with reference to the related figures.

Figure 10:
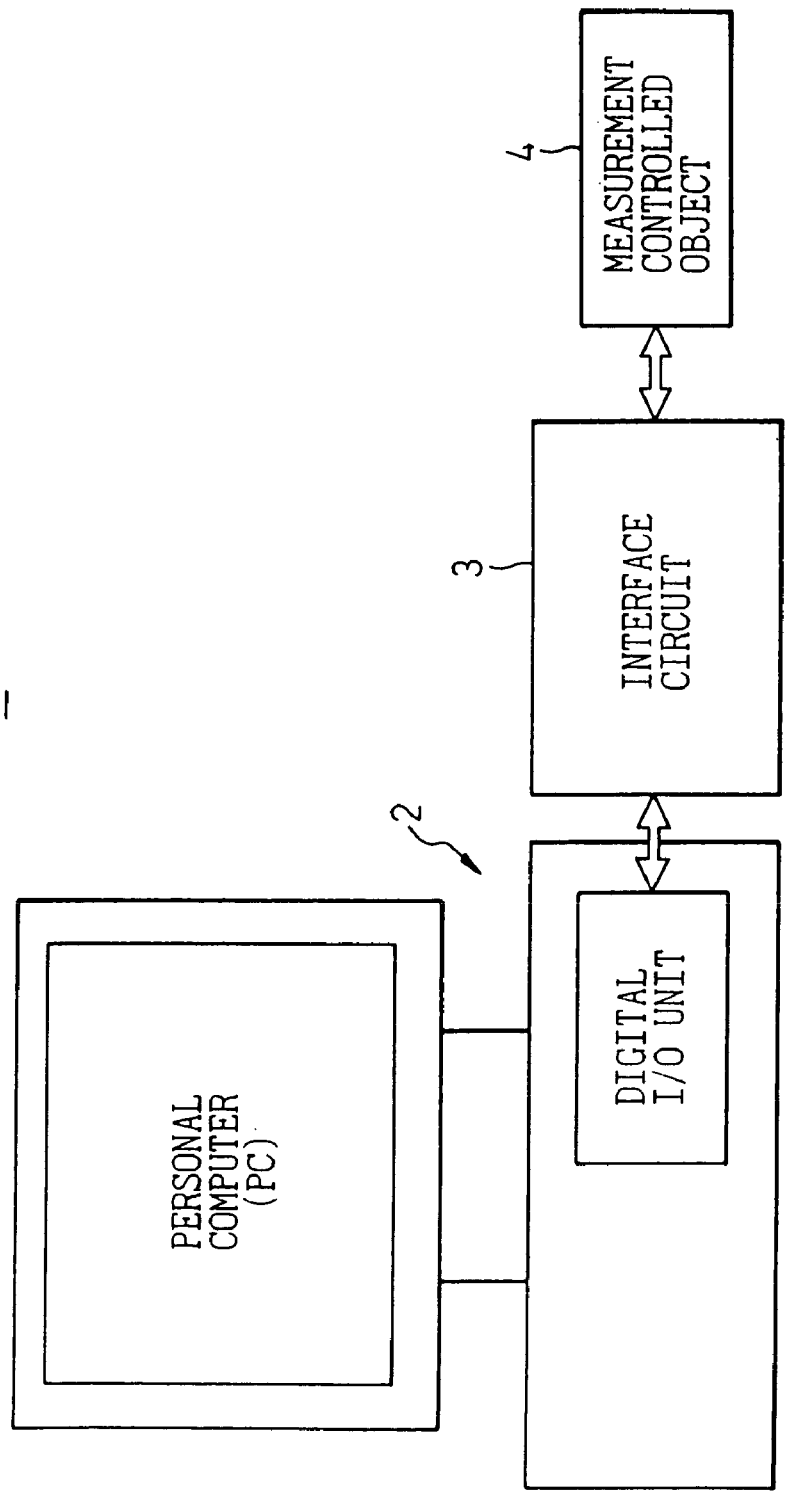
FIG. 10 is a view of the conventional configuration of a measurement control apparatus.

FIG. 10 is a view of the conventional configuration of a measurement control apparatus. In the figure, reference numeral 1 represents a measurement control apparatus. The apparatus 1 is mainly comprised of a measurement control processor 2 and interface circuits 3. When a measurement controlled object 4 is given, one interface circuit 3 compatible with that object 4 is used so as to output measurement control data compatible with the object 4 from the processor 2 to the object 4. When response data is returned from the object 4 operating based on this measurement control data, this is input to the processor 2 through the interface circuit 3.

When for example the measurement controlled object 4 is the above ECU, rather than mount this ECU into an actual vehicle, it is possible to simulate the operating state of the vehicle by a PC (FIG. 10). In general, this is called a "hardware in the loop simulation (HILS)" system.

As explained above, there are a plurality of interface circuits 3 provided corresponding to the circuit configurations of the various measurement controlled objects 4. Therefore, in the past, when a new measurement controlled object 4 was presented for measurement, one of the following operations had to be performed by the user manually:

i) preparing an interface circuit 3 compatible with the newly given measurement controlled object 4, ii) designing and preparing a plurality of types of interface circuits in advance and reconnection is achieved by using a switch for switching to one interface circuit compatible with an object 4 which is given, and iii) preparing a plurality of channels of fixed interface circuits in advance and reconfiguring the channels in accordance with the object 4 given.

Therefore, in a conventional measurement control apparatus 1, there was the problem that considerable work and time were required to assemble a compatible interface circuit into the apparatus 1.

Further, looking in particular at the above operation ii) or iii), when a user performed the reconnection operation or channel reconfiguration operation, a mistake by the user (error in reconnection or error in reconfiguration) in the work for reconnection or channel reconfiguration would cause the measurement controlled object 4 to break down or sometimes burn out.

Therefore, the present invention realizes a measurement control apparatus which does not require manual switching of the interface circuit by the user and can eliminate breakdowns or burnout of the measurement controlled object. This will be explained in detail below.

Figure 1:
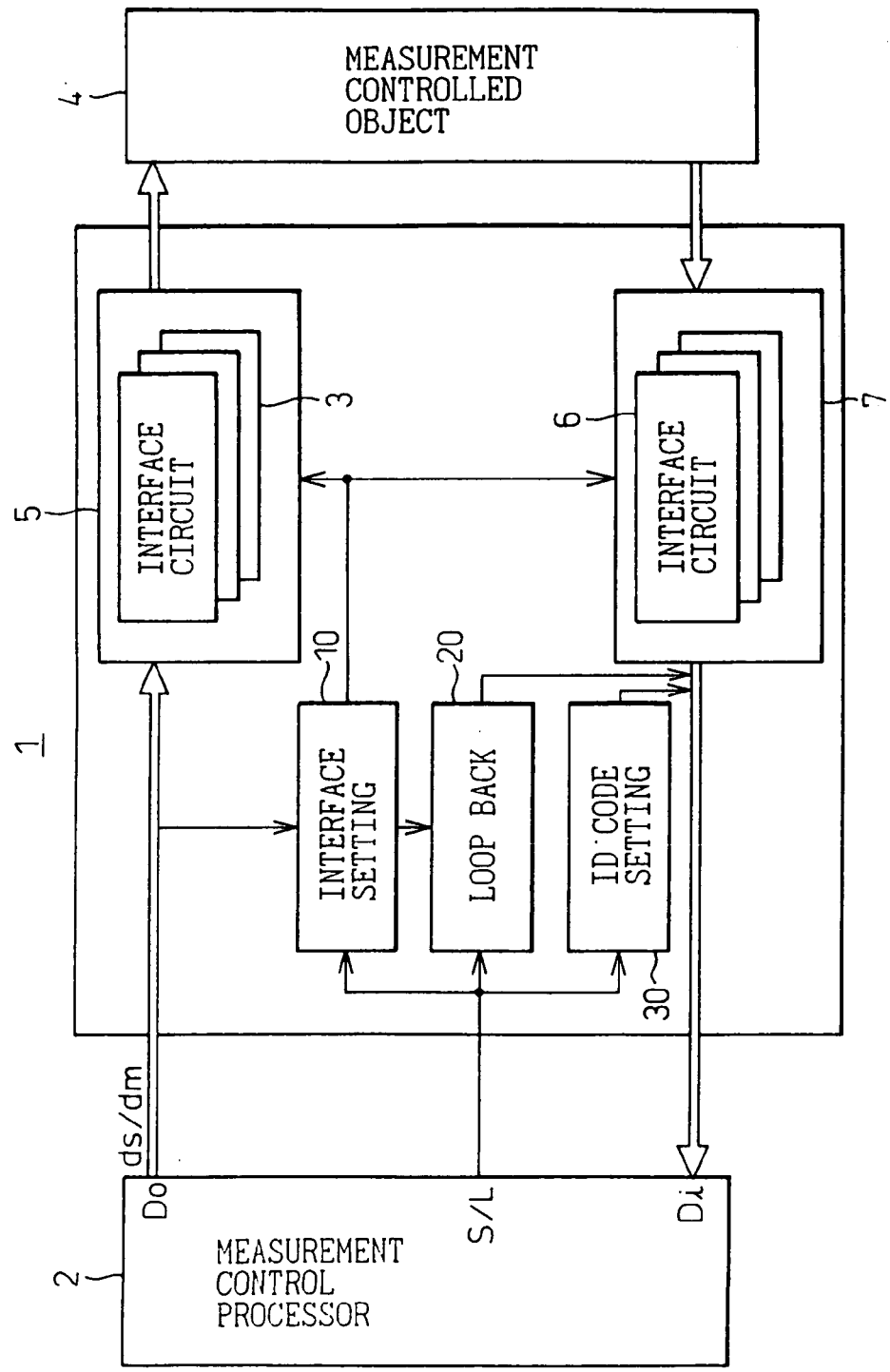
FIG. 1 is a view of the basic configuration of the present invention.

FIG. 1 is a view of the basic configuration of the present invention. Note that throughout the drawings, the same components are assigned the same reference numerals or symbols. In FIG. 1, looking first at the already explained interface circuits 3, a plurality of types of circuits are prepared in advance and grouped together to form an interface circuit unit 5.

Similarly, a plurality of types of input interface circuits 6 are prepared in advance and grouped together to form an input interface circuit unit 7. The point to particularly note in this figure is the introduction of an interface setting means 10. Preferably, a loopback means 20 and an identification code setting means 30 are also introduced.

First, basically, the measurement control apparatus 1 according to the present invention is provided with an interface circuit unit 5 having a plurality of types of interface circuits 3 compatible with a plurality of types of measurement controlled objects 4 and a measurement control processor 2 for selecting one interface circuit compatible with any one measurement controlled object 4 and executing predetermined measurement control.

In such a measurement control apparatus 1, when a measurement controlled object 4 is given, the measurement control processor 2 outputs from the output port Do interface setting data ds (select data) for setting one interface circuit 3 compatible with a measurement controlled object 4 among the plurality of types of interface circuits 3 in advance of output of the measurement control data dm (measurement data) from the output port Do to the measurement controlled object 4.

Here, the above interface setting means 10 does not allow input of the interface setting data ds to the interface circuit unit 5 while the interface setting data ds is being output.

Further, the loopback means 20 returns the interface setting data ds latched to the interface setting means 10 to the input port Di of the measurement control processor 2. Further, the measurement control processor 2 confirms that the interface setting data which it output itself and the returned interface setting data match.

Further, the identification code setting means 30 is configured to enable a unique identification code set for each of the plurality of types of interface circuits 3 to be sent to the input port Di of the measurement control processor 2. When one interface circuit 3 is selected, the unique identification code set for the interface circuit is sent from the identification code setting means 30 to the measurement control processor 2.

The measurement control processor 2 confirms that the interface circuit corresponding to the sent identification code matches the interface circuit which has set by the processor itself.

Due to the above basic configuration of the present invention, there is no longer any need for a user to manually select an interface circuit as in the related art. Further, the correctness of the selection is automatically confirmed by the processor, so there is almost never breakdown or burnout of the measurement controlled object.

Figure 2:
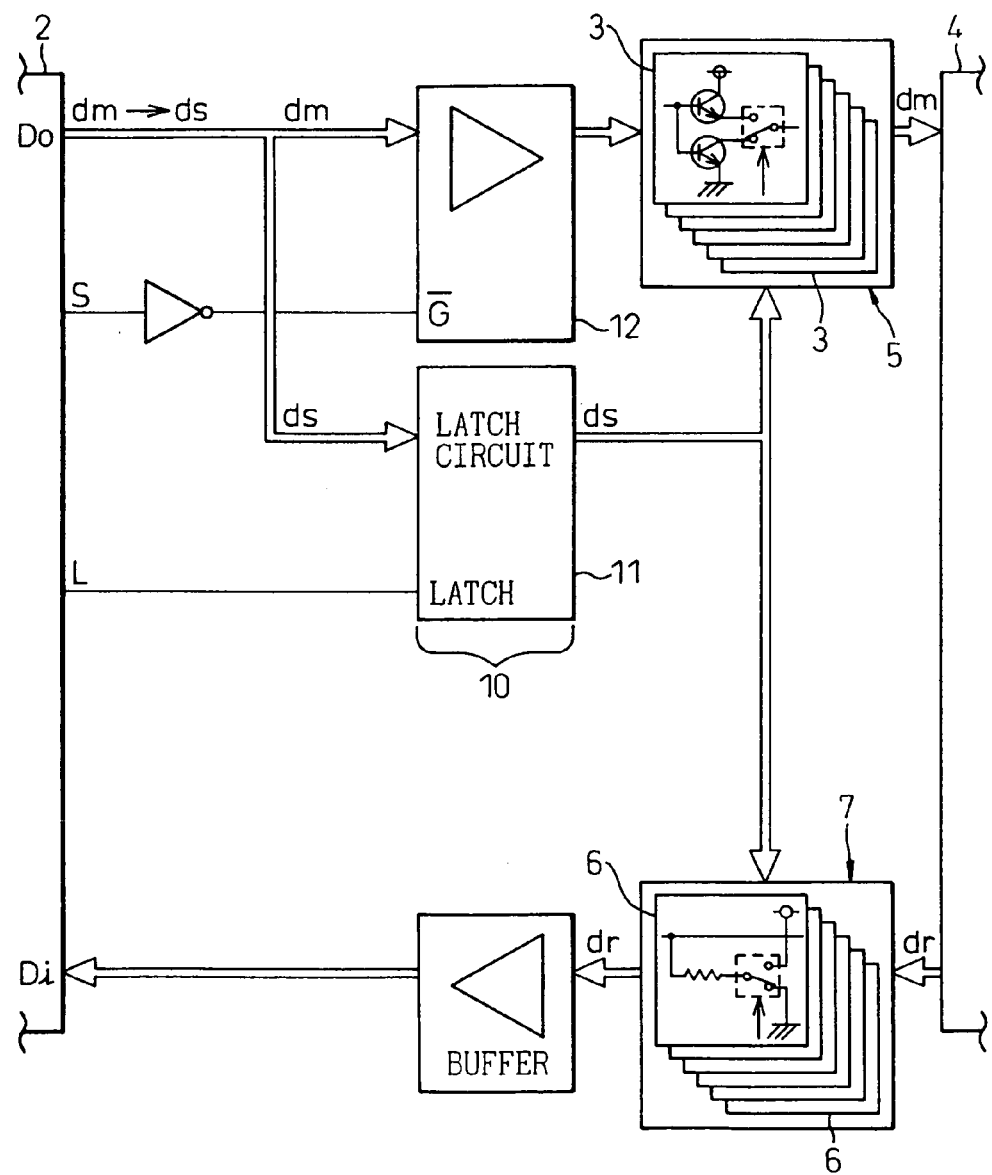
FIG. 2 is a view of a first embodiment of the present invention.

FIG. 2 is a view of a first embodiment of the present invention.

In the figure, the interface setting means 10 of FIG. 1 is shown more concretely. That is, the means 10 is comprised of a latch circuit 11 and a gated buffer circuit 12.

The latch circuit 11 latches interface setting data ds from the output port Do of the processor 2 by the illustrated L (Latch) signal among the control signals from the measurement control processor 2. The processor 2 knows what kind of object the object to be measured is, so can designate the one interface circuit 3 compatible with that object by the data ds. The data ds is output sharing the output port Do outputting the inherent measurement control data dm and in advance of the transmission of that data dm. This is one of the characterizing features of the present invention.

In this case, the interface setting data ds must not be input to the interface circuit unit 5 side while the data ds is being transmitted from the output port Do (input prohibited). The reason is that the data ds is not the inherent measurement control data dm to be input to the measurement controlled object 4. Therefore, the gated buffer circuit 12 is turned off by one of the control signals from the processor 2, that is, the S (Select) signal.

Next, the interface setting data ds is held by the latch circuit 11 so as to continue to make the set interface circuit 3 active while the inherent measurement control data dm is continuing to be output, that is, while the processor 2 is evaluating the measurement controlled object 4.

The present invention is sufficient if applied to only the output side (Do) of the measurement control processor 2, but it is also possible to provide, in addition to the interface circuit unit 5, an input interface circuit unit 7 arranged at the input side for receiving response data from the measurement controlled object 4 to the measurement control processor 2 and having a plurality of input interface circuits 6 compatible with a plurality of types of measurement controlled objects 4.

Further, the interface setting means 10 also sets one compatible input interface circuit 6. This setting is performed by the latch circuit 11. Note that the time charts of the data and signals output from the processor 2 will be explained in detail later with reference to FIG. 7 and FIG. 8.

In this way, the present invention divides the output state of one output port Do into the "state of output of data for switching the interface circuit" and "state of output of inherent measurement control data to the measurement controlled object 4 through the switched interface circuit" and generates these two states in a time-division manner.

The only components added for generating these two states by time-division are the L signal and S signal. Specifically, for example, when the digital signal port is composed of an 8-ch (channel) and 8 ch of interface switching signals are required for each port, if the switching signals are prepared separately, a total of 8 ch digital signals becomes necessary. As opposed to this, according to the present invention, only the two above L signal line and S signal line are sufficient.

Figure 3:
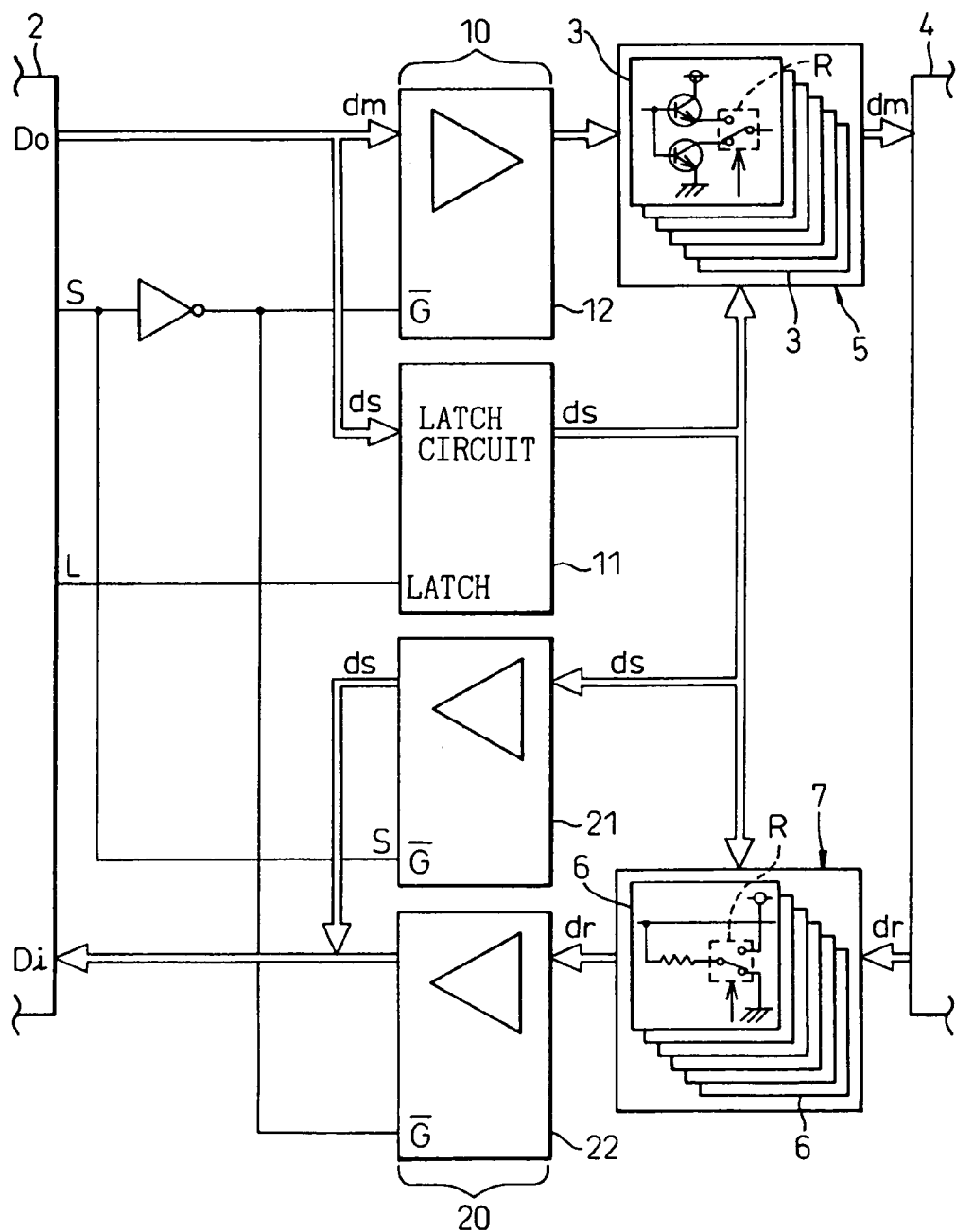
FIG. 3 is a view of a second embodiment of the present invention.

FIG. 3 shows a second embodiment of the present invention.

The second embodiment, as shown in the figure, further includes the loopback means 20. This means 20 is mainly comprised of the gated buffer circuit 21. Interface setting data ds latched at the latch circuit 11 is returned to the input port Di of the measurement control processor 2 through this buffer circuit 21. The processor 2 compares the data ds which it output itself first and the returned data ds and can confirm that the interface setting data ds was correctly output when judging that the two match.

The buffer circuit 21 for returning the data can be turned on by the above S signal among the control signals.

In this case, the data from the input interface circuit unit 7 side must be blocked while the data ds is being returned to the input port Di by the buffer circuit 21. This is because if the two data are combined, the data ds cannot be correctly confirmed.

Therefore, an input gate unit 22 for controlling the passing of the response data dr from the measurement controlled object 4 to the measurement control processor 2 or prohibiting its transmission is provided at the output side of the input interface circuit unit 7. When the loopback means 20 is to be activated (gated buffer circuit 21 is turned on), the transmission of the response data dr must be prohibited by this input gate unit.

Therefore, according to the second embodiment of the present invention, it is possible for the processor 2 to monitor the interface setting data ds output by the measurement control processor 2 and improve the reliability of the selection of the interface circuit 3.

Note that in the above example, the interface setting data ds latched at the latch circuit 11 was looped back, but if actually monitoring and looping back the state of the contact of the relay R switched in accordance with the setting data ds, it is possible to more realistically and accurately monitor the same. In this case, it is also possible to make the relay R by double throw contact relay, use one of the contacts for the interface, and use the other contact (electrically isolated from the first contact) for the monitoring.

Figure 4:
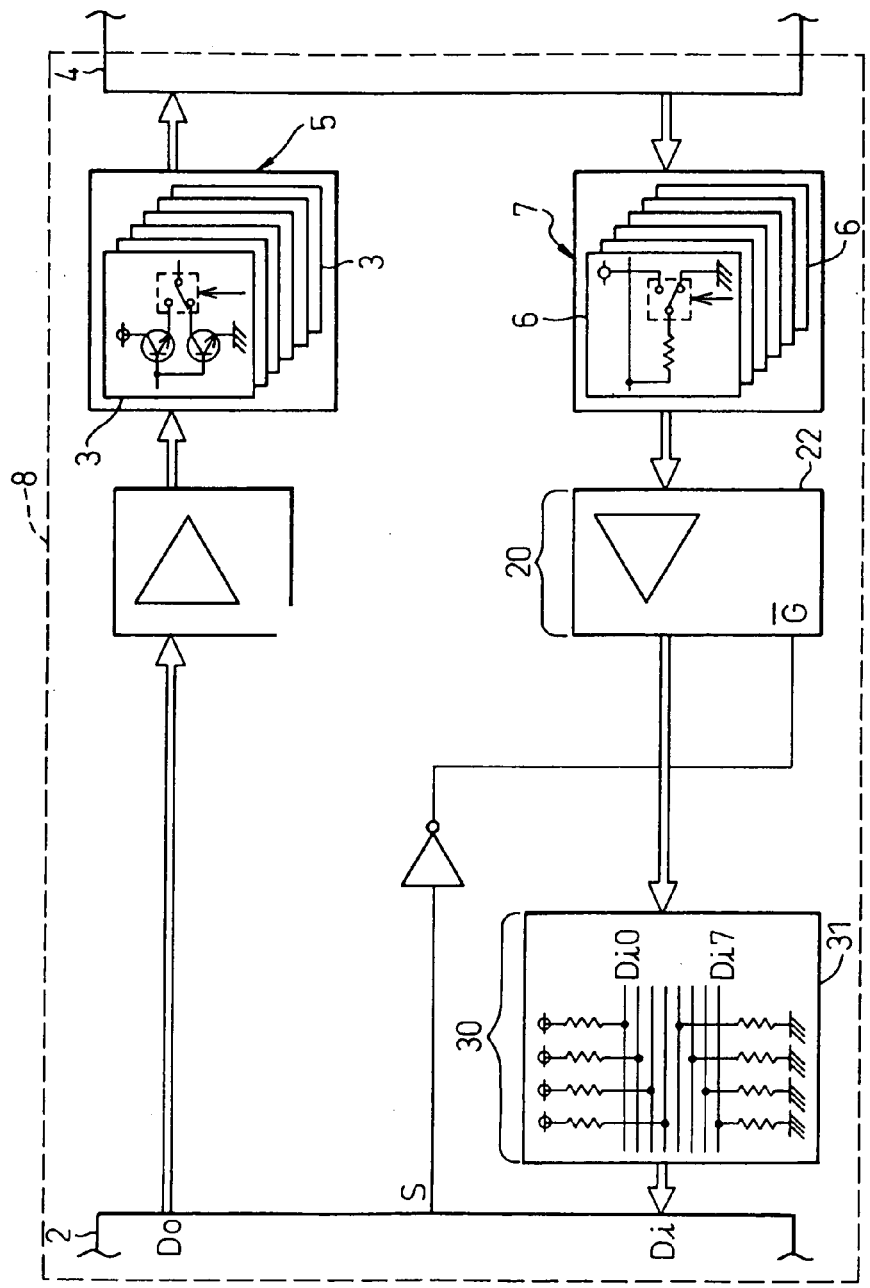
FIG. 4 is a view of a third embodiment of the present invention.

FIG. 4 is a view of a third embodiment of the present invention.

The third embodiment is characterized by provision of the identification code setting means 30.

There are usually several interface boards 8 carrying the interface circuit unit 5 and input interface circuit unit 7. Confirming whether the interface board 8 is correctly set is also effective in preventing breakdowns or burnout of the measurement controlled object 4 in advance. Therefore, the above identification code setting means 30 is provided.

The identification code setting means 30 can be realized in one example by the illustrated code setting circuit 31. In the example of the figure, the lines corresponding to the bits Di0 to Di3 are pulled up, the lines corresponding to the bits Di4 to Di7 are pulled down, and the identification code (00001111) is applied to the input port Di.

In this case, the input interface circuit unit of the 7 side of the code setting circuit 31 has to be set in the high impedance (Hz) state. That is, the input gate unit 22 has to be turned off. Further, while not shown in FIG. 4, the gated buffer circuit 21 forming the loopback means 20 shown in FIG. 3 also has to be turned off. This is because if it is not set in the high impedance state in this way, the intended bit data (00001111) cannot be output from the code setting circuit 31. Note that when either the gated buffer circuit 21 or the input gate unit 22 is turned on, the bit (H/L) of the data thereof passes through the code setting circuit 31 as it is.

Therefore, according to the third embodiment of the present invention, selection of an erroneous interface board 8 is prevented.

Figure 5:
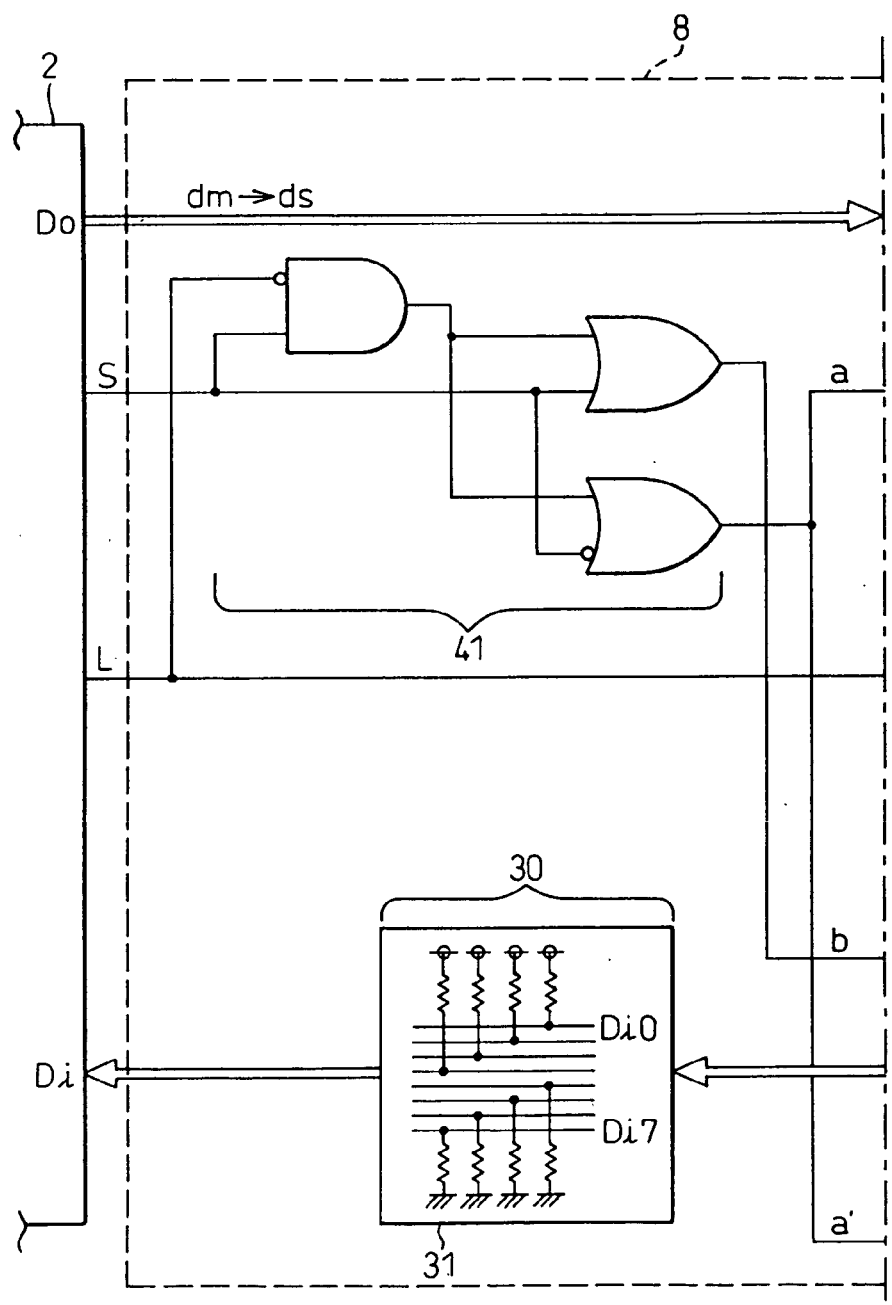
FIG. 5 is a first part of a view of a fourth embodiment of the present invention.
Figure 6:
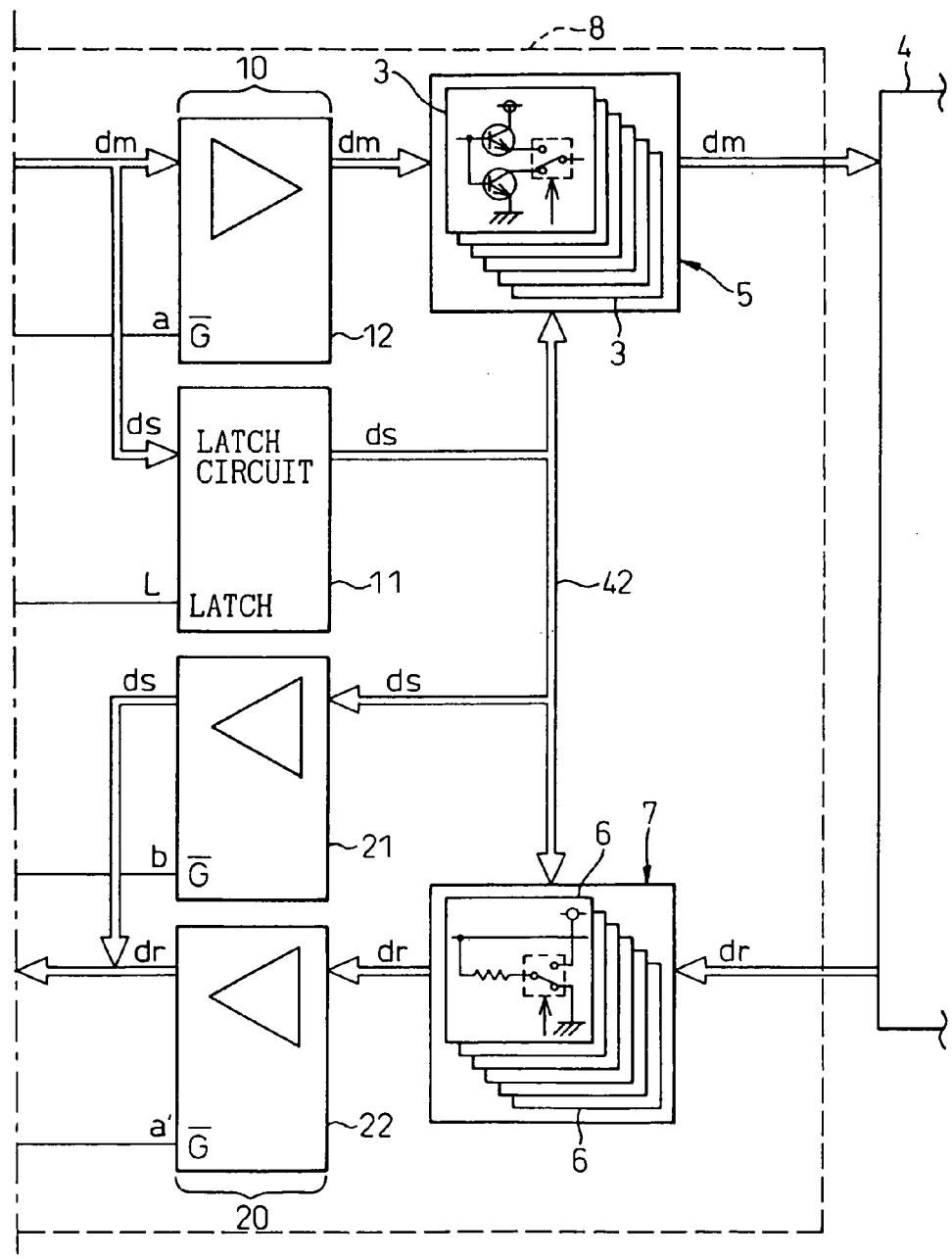
FIG. 6 is a second part of a view of a fourth embodiment of the present invention.

FIG. 5 is a first part of a view of a fourth embodiment of the present invention, while FIG. 6 is a second part.

The fourth embodiment combines all of the first to third embodiments discussed up to here. The parts were already explained. In particular, the component newly shown in the figures is the logic gate 41. This logic gate 41 is useful in preparing the high impedance state explained in the third embodiment. That is, only when confirming the identification code by the S signal and the L signal, the gated buffer circuit 21 and the input gate unit 22 are both turned off and the high impedance state can be prepared. Next, the sequence of the data and signals of the principal parts in FIG. 5 and FIG. 6 will be explained.

Figure 7:
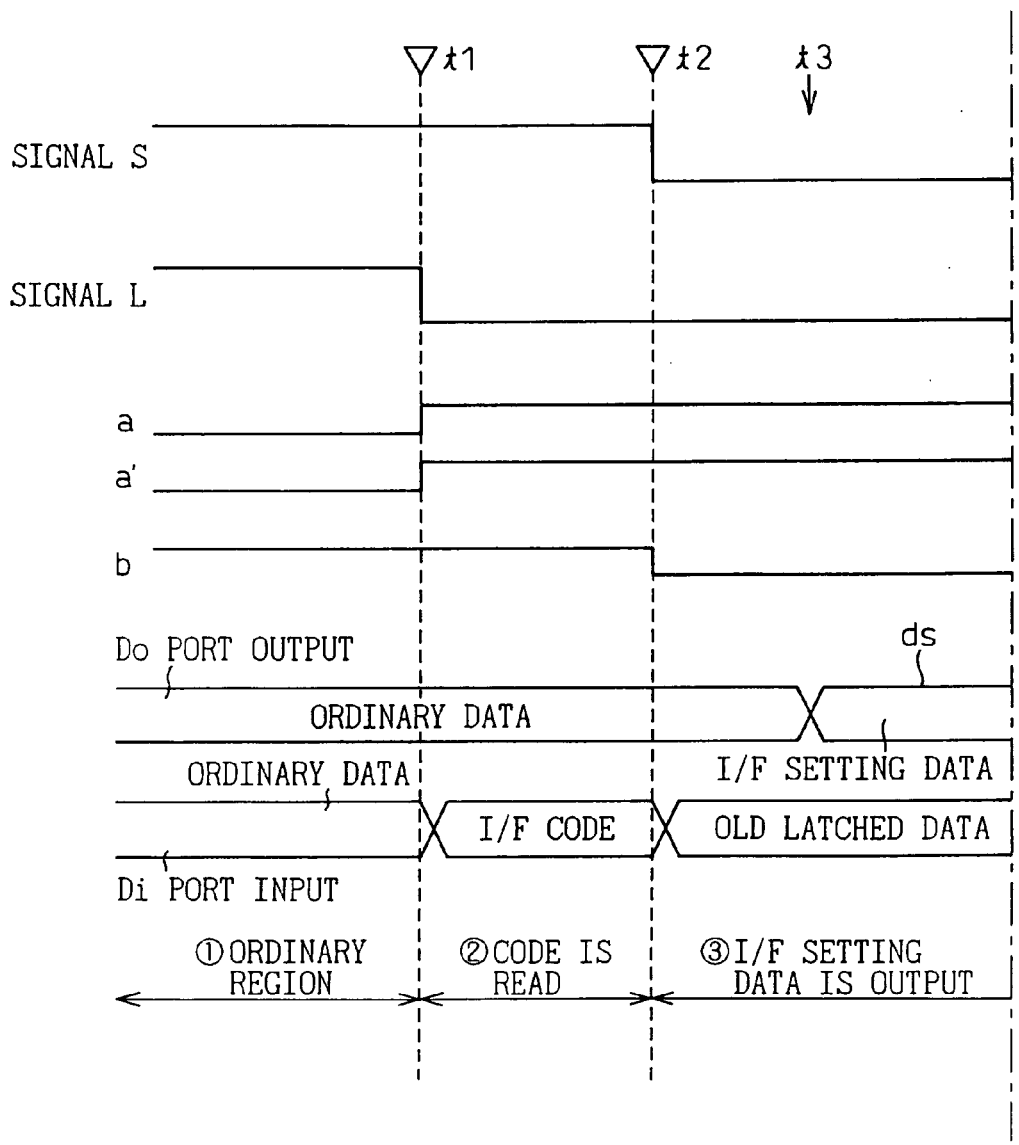
FIG. 7 is a first part of a time chart showing data and signals of principal parts in the fourth embodiment.
Figure 8:
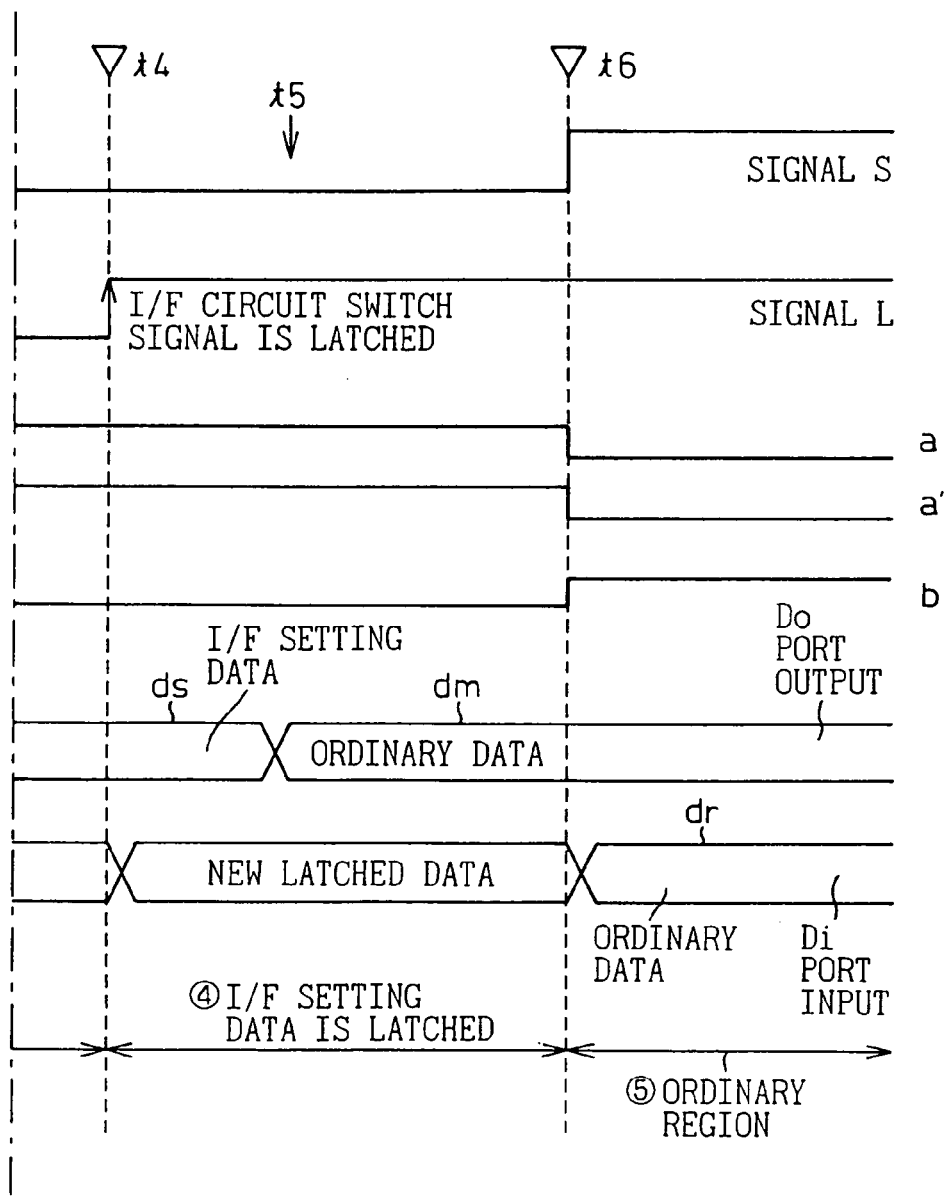
FIG. 8 is a second part of a time chart showing data and signals of principal parts in the fourth embodiment.

FIG. 7 is a first part of a time chart of the data and signals of the principal parts of the fourth embodiment, while FIG. 8 is a second part of the time chart.

The time charts of FIG. 7 and FIG. 8 will be explained while referring to FIG. 5 and FIG. 6. Note that among the types of data or signals in the columns at the left in FIG. 7, the ones first defined here are a, a', and b. These a, a', and b are the control signals appearing at a, a', and b in FIG. 5 and FIG. 6.

The period from the time t1, where the L signal is switched from H (high) to L (low), to t2 is the operation according to the third embodiment of FIG. 5 and FIG. 6, that is, the operation of the processor 2 confirming the identification code (I/F code) of the interface board 8. At this time, through the intervention of the logical gate 41 of FIG. 5, the signals a, a', and b are generated from the S signal and the L signal, the gated buffer circuit 21 and the input gate unit 22 are simultaneously turned off, and the above mentioned high impedance state is created. Note that at this time, the gated buffer circuit 12 is off, while the latch circuit 11 is on.

Next, at the time t2, when the S signal switches from H to L, the output phase of the interface setting data is started. This is the phase in which the first embodiment of FIG. 2 functions.

Further, at the time t3, the measurement control processor 2 outputs the above interface (I/F) setting data ds from the Do port.

While the interface setting data ds is being output, the time t4 is reached. Here, the processor 2 switches the L signal from L to H. Here, the latch circuit 11 latches the data ds and enters the phase for latching the interface (I/F) setting data.

While this phase starts (t4) up to the time t5, the second embodiment of FIG. 3 functions. That is, at this time, the interface setting data ds, latched at the latch circuit 11, passes through the bus 42 and via the now on gated buffer circuit 21 and is looped back to the Di port of the processor 2 where the setting data ds is confirmed. At this time, the input gate unit 22 is off since a'=H.

Further, at the time t5, the inherent measurement control data dm is output from the processor 2, passes via the interface circuit 3, and is applied to the measurement controlled object 4.

The data dr from the object 4 responding to the data dm is input to the Di port of the processor 2 from the time t6.

Figure 9:
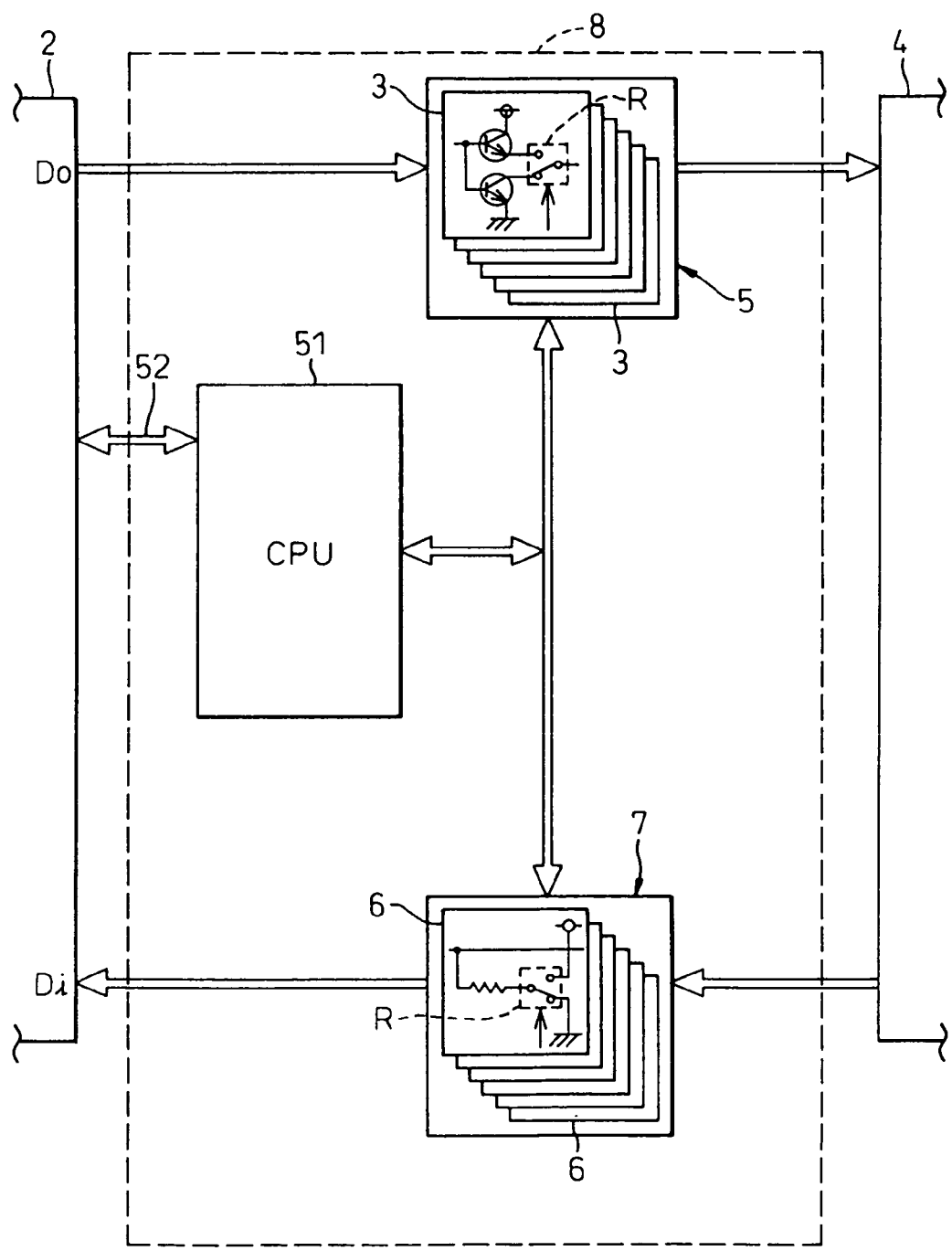
FIG. 9 is a view of a fifth embodiment of the present invention.

FIG. 9 is a view of a fifth embodiment of the present invention.

In the fifth embodiment, all of the functions to be performed by the fourth embodiment (FIG. 5 and FIG. 6) are realized by digital processing by for example a CPU 51 provided on the interface board 8. Therefore, a signal line 52 is provided between the CPU 51 and the measurement control processor 2 and the commands, data, etc. for the various processing are serially transferred (or parallel transferred) over this signal line 52.

The processing performed by this serial transfer (or parallel transfer) include for example the following:
setting of the latch data
confirmation of the latch data
control of timing
transfer of commands
output of interface identification code The main functions of the CPU 51 are as follows:

First, there is the interface setting function for activating only the interface circuit while prohibiting input of the interface setting data ds to the interface circuit unit 5 when the interface setting data ds is to be output. This is executed by the CPU 51.

Second, there is the loopback function for returning the interface setting data ds set by the interface setting function of the CPU to the input port Di of the measurement control processor 2. This loopback function is executed by the CPU 51.

Third, there is the identification code output function for sending a unique identification code set for each interface board carrying a plurality of types of interface circuits 3 thereon to the input port Di of the measurement control processor 2. This identification code output function is executed by the CPU 51.

In the above second to fifth embodiments, preferably an alarm is issued to the user at the time of abnormalities.

First, the measurement control processor 2 monitors whether the interface setting data which it output itself and the returned interface setting data match and issues an alarm when they do not match.

Second, the measurement control processor 2 monitors if the interface board corresponding to the sent identification code and the interface board which it set itself match and issues an alarm when they do not match.

The above alarm is given to the user by for example displaying "INTERFACE CIRCUIT SEQUENCE ABNORMALITY" on the screen of the PC.

More preferably, at the same time as the alarm is issued, the measurement control system comprised of the measurement controlled object 4 and the measurement control apparatus 1 are made to shift to the failsafe mode.

Several modes of this failsafe mechanism are given below:

The supply of power to the measurement controlled object 4 is immediately prohibited.

After detection of a mismatch, the measurement control apparatus 1 is locked and not restarted until reset.

The gated buffer circuits (12, 21, and 22) are all turned off and all input to the measurement controlled object 4 is prohibited.

The output from the Do port is made such content as shifting to the safe mode.

Summarizing the effects of the invention, as explained above, according to the present invention, by just adding the two signal lines for the S signal and L signal, the object of the present invention, that is, automatic selection of the interface circuit without error, is realized. In this case, even if there is an abnormality in the latch circuit or the interface board is erroneously selected, this can be discovered in advance and therefore will never lead to burnout of the ECU or other measurement controlled objects 4.

While the invention has been described with reference to specific embodiments chosen for purpose of illustration, it should be apparent that numerous modifications could be made thereto by those skilled in the art without departing from the basic concept and scope of the invention.

What is claimed is:

1. A measurement control apparatus comprising an interface circuit unit having a plurality of types of interface circuits compatible with a plurality of types of measurement controlled objects, and a measurement control processor for selecting one interface circuit compatible with any one measurement controlled object and for executing predetermined measurement control, wherein when said one measurement controlled object is given, the measurement control processor outputs from an output port, interface setting data for setting one interface circuit compatible with a measurement controlled object among the plurality of types of interface circuits before output of measurement control data from the output port to the measurement controlled object, and wherein further provision is made of an interface setting function unit located between said interface circuit unit and said measurement control processor, the interface setting function unit being comprised of following units (i) and (ii):

(i) a gate function unit, coupled between said output port and a first input terminal of said interface circuit unit for receiving the measurement control data, the gate function unit for preventing input of said interface setting data to said interface circuit unit while the interface setting data is being output from said measurement control processor; and (ii) a selecting function unit, coupled between said output port and a second input terminal of said interface circuit unit, for receiving said interface setting data and holding a selection of said one interface circuit which is selected by the interface setting data while said measurement control data is being output from said output port.

2. A measurement control apparatus as set forth in claim 1, wherein the apparatus is further provided with an input interface circuit unit arranged at an input side of the measurement control processor for receiving response data from the measurement controlled object and supplying the response data to the measurement control processor and having a plurality of input interface circuits compatible with a plurality of types of measurement controlled objects, in addition to said interface circuit unit arranged at an output side of the measurement control processor for outputting said measurement control data from said measurement control processor to said measurement controlled object; and wherein said interface setting function unit sets the one of the input interface circuits compatible with the one measurement controlled object when it is given.

3. A measurement control apparatus as set forth in claim 1, wherein said measurement control processor is configured to output a control signal for selecting said one interface circuit; and wherein said interface setting function unit does not allow input of said interface setting data to said interface circuit unit after receiving said control signal.

4. A measurement control apparatus as set forth in claim 3, wherein said interface setting function unit includes a gated buffer circuit for prohibiting input to said interface circuit unit upon receiving said control signal.

5. A measurement control apparatus as set forth in claim 1, wherein the interface setting data is latched at said interface setting function unit;
wherein said apparatus is further provided with a loopback function unit for returning said interface setting data latched at said interface setting function unit to an input port of said measurement control processor; and
wherein said measurement control processor confirms that said interface setting data which it output itself and the returned interface setting data match.

6. A measurement control apparatus as set forth in claim 5, wherein the apparatus is further provided with an input interface circuit unit arranged at an input side of the measurement control processor for receiving response data from the measurement controlled object and supplying the response data to the measurement control processor and having a plurality of input interface circuits compatible with a plurality of types of measurement controlled objects, in addition to said interface circuit unit arranged at an output side of the measurement control processor for outputting said measurement control data from said measurement control processor to said measurement controlled object; and
wherein said interface setting function unit sets the one of the input interface circuits compatible with the one measurement controlled object when it is given.

7. A measurement control apparatus as set forth in claim 6, further provided, at the output side of said input interface circuit unit, with an input gate unit for controlling the passing or prohibiting transmission of response data from said measurement controlled object to said measurement control processor and prohibiting the transmission of said response data by said input gate unit when activating said loopback function unit.

8. A measurement control apparatus as set forth in claim 6, wherein said measurement control processor is configured to output a control signal for selecting said one interface circuit; and
wherein said loopback function unit includes a gated buffer circuit operating upon input of said control signal.

9. A measurement control apparatus as set forth in claim 5, wherein the measurement control processor monitors whether the interface setting data which it output itself and the returned interface setting data match and issues an alarm when they do not match.

10. A measurement control apparatus as set forth in claim 9, which, at the same time as issuing the alarm, shifts the measurement control system comprised of the measurement controlled object and the measurement control apparatus to a failsafe mode.

11. The measurement control apparatus of claim 1 further comprising a plurality of interface boards each carrying at least one interface circuit unit having a plurality of types of interface circuits, and an identification code setting function unit configured to be able to transmit a unique identification code set for each interface board to an input port of said measurement control processor and transmits said unique identification code set for said interface board from said identification code setting function unit to said measurement control processor,
wherein said measurement control processor confirms that the interface board corresponding to a transmitted unique identification code and the interface board which it sets itself match.

12. A measurement control apparatus as set forth in claim 11, wherein the apparatus is further provided with an input interface circuit unit arranged at an input side of the measurement control processor for receiving response data from the measurement controlled object and supplying the response data to the measurement control processor and having a plurality of input interface circuits compatible with a plurality of types of measurement controlled objects, in addition to said interface circuit unit arranged at an output side of the measurement control processor for outputting said measurement control data from said measurement control processor to said measurement controlled object and a loopback function unit for returning said interface setting data set in said interface setting function unit to an input port of said measurement control processor.

13. A measurement control apparatus as set forth in claim 11, wherein the measurement control processor monitors if the interface board corresponding to the transmitted unique identification code and the interface board which it set itself match and issues an alarm when they do not match.

14. A measurement control apparatus as set forth in claim 13, which, at the same time as issuing the alarm, shifts the measurement control system comprised of the measurement controlled object and the measurement control apparatus to a failsafe mode.

15. A measurement control apparatus for controlling a selected measurement controlled object from among a plurality of measurement controlled objects, the apparatus comprising:
a plurality of interface circuits including an interface circuit compatible with the selected measurement controlled object; and
a measurement control processor coupled to the plurality of interface circuits for generating an interface setting data for choosing the compatible interface circuit and for generating a corresponding measurement control data for controlling the selected measurement controlled object, the interface setting data and the measurement control data being output in series from the measurement control processor, the interface setting data being output before the corresponding measurement control data; and
an interface setting unit coupled between the plurality of interface circuits and the measurement control processor, the interface setting unit including:
a selecting latch unit coupled between the measurement control processor and a first input port of the plurality of interface circuits for receiving the interface setting data to the first input port for the choosing the compatible interface circuit; and
a gated buffer unit coupled between the measurement control processor and a second input port of the plurality of interface circuits for receiving the measurement control data to the compatible interface circuit,
wherein the gated buffer unit prevents input of the interface setting data to the second input port while the interface setting data is being output by the measurement control processor, and
wherein the selecting latch unit holds the interface setting data while the measurement control data is being output by the measurement control processor.

* * * * *

UNITED STATES PATENT AND TRADEMARK OFFICE
CERTIFICATE OF CORRECTION

PATENT NO.        : 7,200,510 B2                              Page 1 of 1
APPLICATION NO.   : 10/109793
DATED             : April 3, 2007
INVENTOR(S)       : Yasuda et al.

It is certified that error appears in the above-identified patent and that said Letters Patent is hereby corrected as shown below:

On the Title Page

(56) References Cited       Delete duplicate reference "JP 07084819 A * 3/1995"

In the Claims

Column 8, line 33, Claim 1      Delete "of",
                                Insert --for--

Column 9, line 16, Claim 5      Delete "output",
                                Insert --outputs--

Column 9, line 50, Claim 9      Delete "output",
                                Insert --outputs--

Column 10, line 23, Claim 13    Delete "set",
                                Insert --sets--

Signed and Sealed this

Eighth Day of January, 2008

JON W. DUDAS
*Director of the United States Patent and Trademark Office*